March 10, 1931.  R. A. MacCOMB  1,795,566
PILOT STAND
Filed Dec. 12, 1927   2 Sheets-Sheet 2
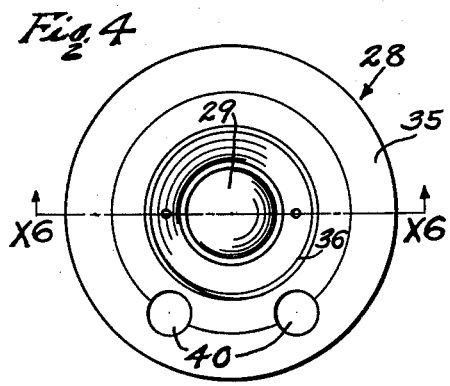
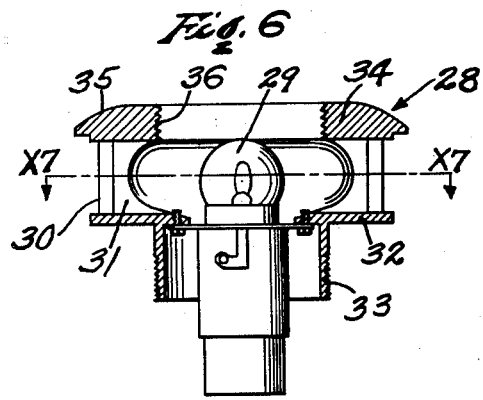
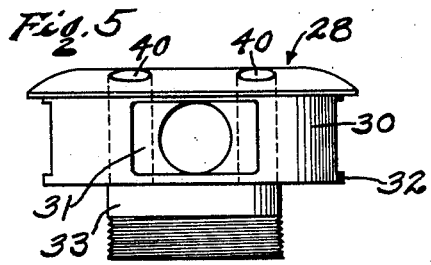
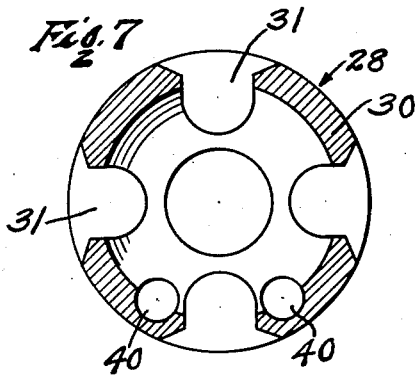
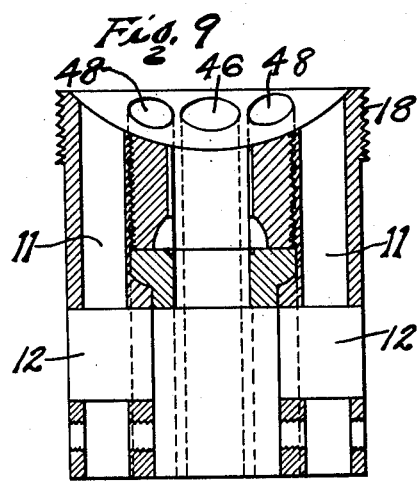
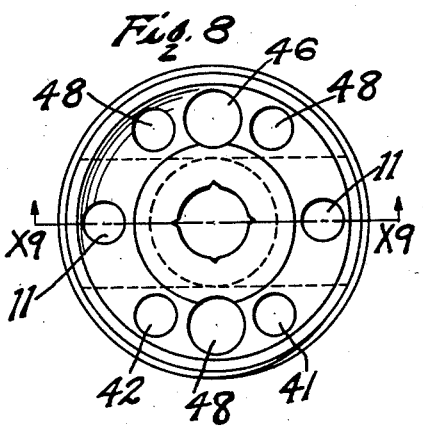
INVENTOR
RICHARD ALBERT MacCOMB Patented Mar. 10, 1931

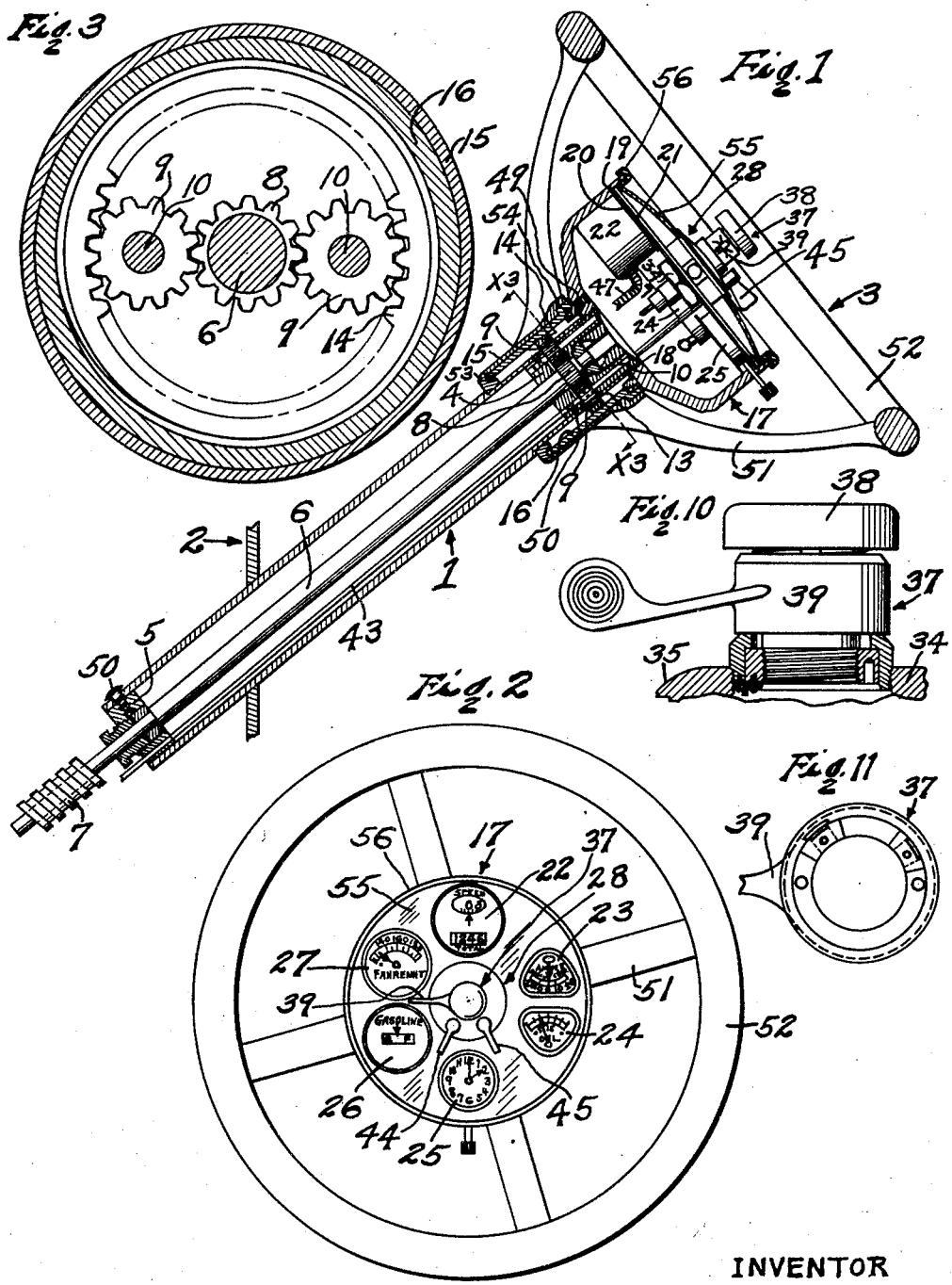

1,795,566

UNITED STATES PATENT OFFICE

RICHARD ALBERT MacCOMB, OF VENTURA, CALIFORNIA

PILOT STAND

Application filed December 12, 1927. Serial No. 239,377.

This invention is an improvement in the art of increasing the ease and safety of motor vehicle operation.

An object of my invention is to provide a mounting of simple construction, in which the several controlling elements of a self-propelled vehicle and the several instruments for indicating its running condition are assembled for handling and installation as a unit.

A feature of the invention is an instrument case nested within the steering wheel whereby reading the several instruments may be accomplished with minimum distraction from the steering operation.

An advantage is that a driver will have all of the several engine control elements and all of the several indicators of the running condition of the engine within a range of vision which includes the path of the vehicle and the hand operated element of the steering mechanism.

Other objects, advantages and features of invention may appear from the accompanying drawings, the subjoined detailed description and the appended claims.

The accompanying drawings illustrate the invention.

Figure 1 is a longitudinal sectional elevation of a pilot stand constructed in accordance with my invention.

Fig. 2 is an end elevation showing the instrument case as nested in the steering wheel.

Fig. 3 is a transverse sectional elevation, on line x3, Fig. 1 showing the gear relation between the steering wheel and steering shaft.

Fig. 4 is a plan view of the housing for the lamp at the instrument case.
Fig. 5 is a side elevation of the lamp housing.

Fig. 6 is a sectional elevation of the lamp housing, on line x6, Fig. 4.

Fig. 7 is a sectional plan view of the lamp housing on line x7, Fig. 6.

Fig. 8 is a plan view of the bearing block for the upper end of the steering column.

Fig. 9 is a sectional elevation of the bearing block, on line x9, Fig. 8.
Fig. 10 shows in elevation the horn button and the revolving lever control for all the lights of the car and the means for connecting the same with the instrument case of my invention.

Fig. 11 is an inverted plan view of the light switch of Fig. 10, detached from the instrument case.

1 designates the stand, or body portion, of the structure of my invention which is shown as an open ended cylindrical tube for mounting as upon the dash board 2 of an automobile body to provide a column for the support of a steering wheel 3.

Fitted in the upper and lower ends of the column are the bearing blocks 4 and 5, respectively, providing rotary support for the steering shaft 6.

The steering shaft carries at its lower end an element of the steering gear, such as the conventional worm 7, and at its upper end a gear wheel 8 for mesh with one or more pinions 9 which are carried on shafts, or pins 10, that are mounted in bores 11 formed in the bearing block 4. Suitable openings 12 are formed in the bearing block for the pinions and the pinions each project beyond the periphery of the bearing block and through openings 13 in the column 1 for engagement with a ring gear 14 carried by the hub 15 of the steering wheel. By preference and as shown the ring gear is carried on a sleeve 16, around which the hub proper is formed as by molding.

An instrument case 17 of cylindrical bowl shape is secured over the upper end of the steering column 1, as by being threaded as shown at 18 to the upper end of the bearing block 4. Adjacent its upper end the case is provided with an internal shoulder 19 which forms a support for an instrument board 20 and a trim board 21.

Formed through the instrument board in arrangement for example as shown in Fig. 2 is a plurality, or set, of openings in which are secured a combined speedometer and odometer 22, which is at the top, as shown, and in the following order reading clockwise is an ammeter 23; an oil pressure gage 24; a chronometer 25; a gasoline gage 26 and a motor meter 27.

Formed centrally through the instrument board is an opening in which is secured a housing 28 for a lamp 29 for the illumination of the instrument board. The housing comprises a substantially cylindrical body portion 30, through which holes 31 are formed for the direction of light over the entire area of the instrument board; a base 32 which rests upon the instrument board; a tubular stem 33 which projects through the central opening of the instrument board to receive a retaining nut 34, and a crown, or cap 35 having a central opening 36 which is internally threaded to provide for the attachment and support of a switch unit 37 comprising a button switch 38 for a signal horn, not shown, and a lever-switch 39 for all the switches for the lighting system, not shown.

Formed through the lamp housing and each of the bearing blocks 4 and 5 are openings 40, 41 and 42, respectively, through which shafts such as 43, shown in Fig. 2, are extended for connection with the carburetor and ignition controls, not shown, and to which are connected levers 44 and 45 which stand immediately over the lamp housing as shown.

In Fig. 8 there is shown to be formed through the upper bearing block 4 a bore 46 through which the flexible shaft 47, a fragment only of which is shown, for the operation of the speedometer, may be extended for its continued extension through the steering column and through a bore in the bearing block 4, complementary to the upper bore 46 in the block 4.

Other bores 48 are formed in the bearing block 5 for the accomodation of wires for the operation of the ammeter, lighting system and signal horn, and tubes for the operation of the oil and gas gages, all of which wires and tubes continue through the length of the steering column and through the lower bearing block 5.

The instrument case is secured against unthreading from, or rotating about, the bearing block by means of one or more set screws 49 and each of said bearing blocks are held against rotation in the steering column as by set screws 50, so that the instruments will always remain in their set positions.

In order that the steering wheel, as a whole, may be mounted to revolve about the instrument case, to constitute a protecting guard therefor and to nest all the instruments where they will be in a range of vision including the path of the vehicle and the steering wheel, the spokes 51 are shaped to extend outwardly and upwardly from the hub to support the rim 52 above and about the instrument case.

To provide maximum ease in steering there is interposed between the hub of the steering wheel and the column ball bearings such as 53 and 54.

To protect the set of instruments against dust and dirt a glass cover 55 of convex section is rested at its margins upon the trim board and at its center provided with an opening through which the body of the lamp housing is extended and is secured as by a ring bezel 56 threaded to the wall of the casing, as shown in Fig. 1.

It is thus seen that by combining with a pilot stand, having a steering wheel, an instrument case supported by the pilot stand and nested within the steering wheel, I have produced a new association of elements by which the driver of an automobile or the like, is enabled to have control of the machine with less range of manual movement than heretofore, thus increasing the ease and facility with which he can acquire the automatic and subconscious power of manipulation which is becoming so necessary for successful driving and avoidance of accidents in the high speed and congested traffic of the present day; and have brought into working form a novel construction and arrangement of parts constituting a unitary structure that is adapted to be kept in stock by dealers, and may be applied to motor vehicles either in factories or in repair shops as may be required.

I claim:—

1. A pilot stand comprising a tubular stationary column, an instrument case normally fixed to the column; a steering wheel revolubly mounted on the column and rotatable about said instrument case; a steering shaft in the column, and gearing inside the column connecting the steering wheel and steering shaft.

2. A pilot stand comprising in combination a tubular column; a steering shaft extended through the column; a steering wheel having its hub revolubly mounted on the steering column; a gear relating the shaft and hub; a case secured at the upper end of the column and concentric therewith; a plurality of instruments in said case; said steering wheel having spokes and a rim surrounding said instrument case.

3. A pilot stand comprising in combination a tubular column; a steering shaft extended through the column; a steering wheel having its hub revolubly mounted on the steering column; gearing inside the column relating the shaft and hub; a case secured at the upper end of the column and concentric therewith; a plurality of instruments in said case; said steering wheel having spokes and a rim surrounding said instrument case and an illuminant for the case.

4. A pilot stand comprising a tubular column; bearing blocks detachably and adjustably secured in the length of the column; a steering shaft mounted in said blocks; an instrument case detachably secured to the end of the column in concentric arrangement; a plurality of instruments, for indicating the running condition of an engine which are each detachably mounted on the instrument board; conductors connected with the several instruments and extended through said column; manipulative shafts extended through the column and instrument case and a steering wheel revolubly mounted on the column and having a rim and spokes surrounding and rotatable about the instrument case.

5. A pilot constructed as an assembled unit and comprising a steering column; a steering wheel revolubly mounted on the column; a steering shaft freely journalled inside the column and gearing connecting the steering shaft with the steering wheel and a case for housing instruments for indicating the running condition of an engine and for the support of control devices for the engine.

In testimony whereof, I have hereto set my hand at Los Angeles, California, this 28th day of November, 1927.

RICHARD ALBERT MacCOMB.